Jan. 23, 1934.　　E. A. JOHNSTON ET AL　　1,944,347
WINDROW HARVESTER
Filed July 9, 1928　　2 Sheets-Sheet 1
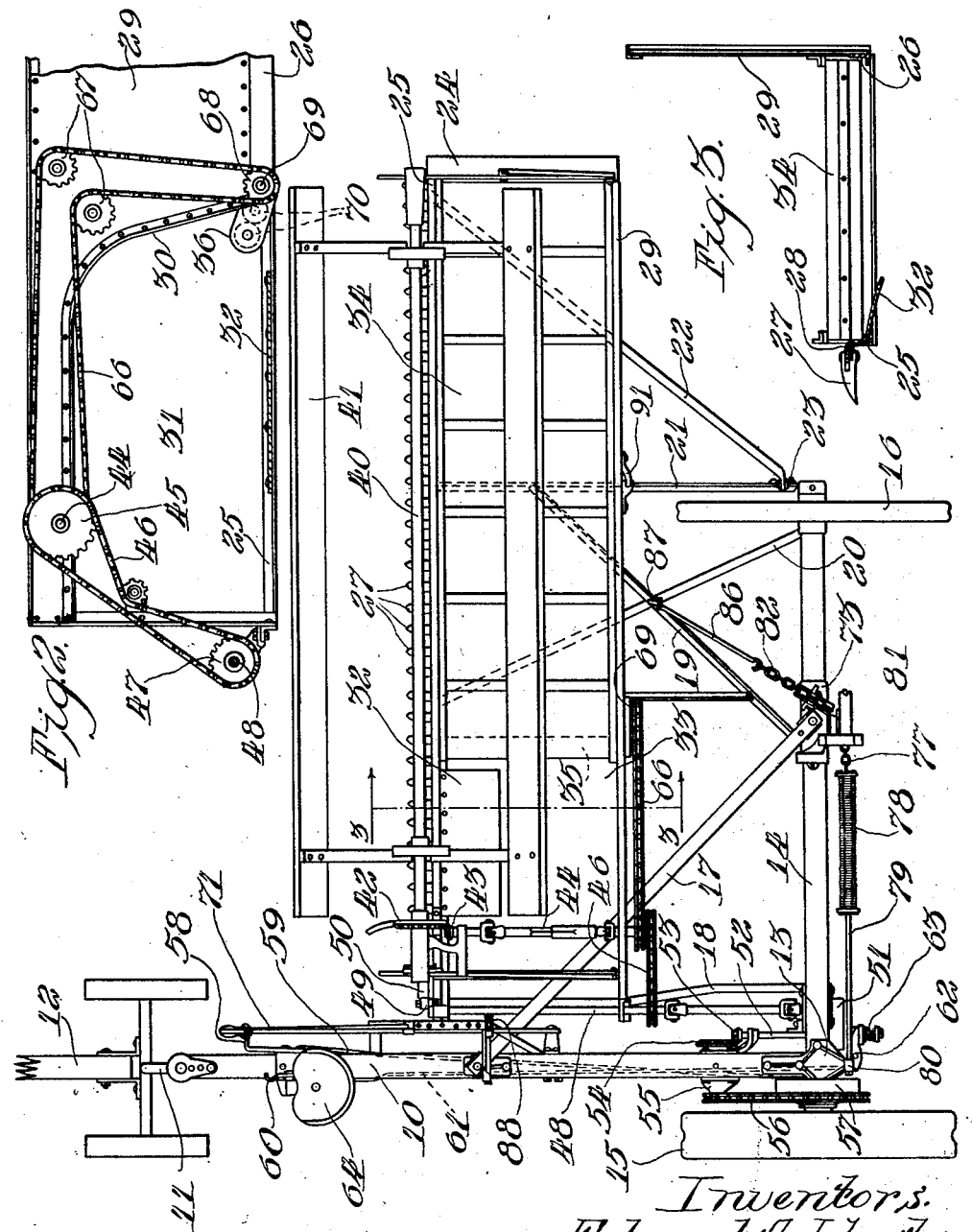
Inventors.
Edward A. Johnston
Alexus C. Lindgren
Clemma R. Raney and
Benjamin M. Hyman.
By their Attorney.

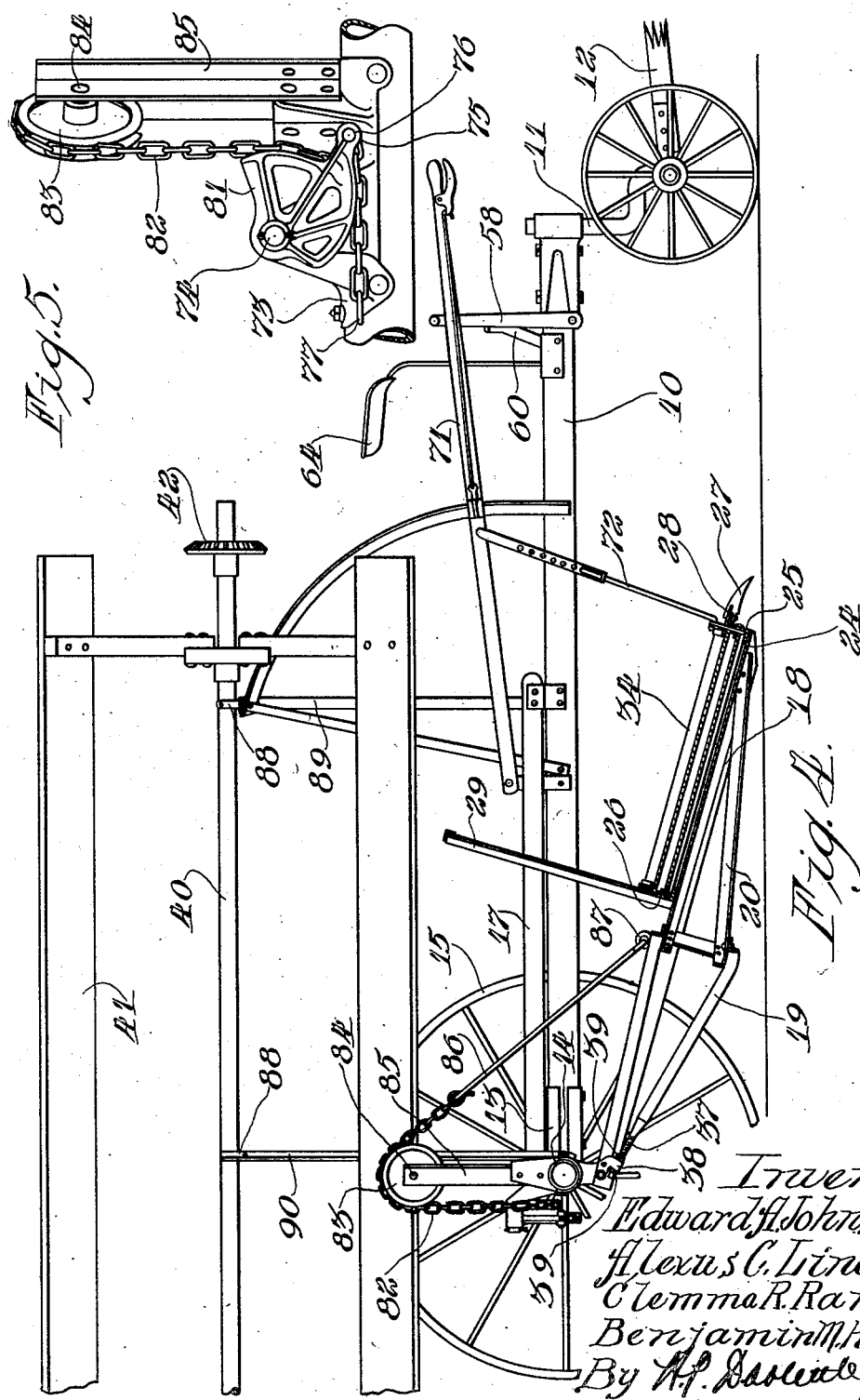

Patented Jan. 23, 1934

1,944,347

UNITED STATES PATENT OFFICE 1,944,347

WINDROW HARVESTER

Edward A. Johnston and Alexus C. Lindgren, Chicago, and Clemma R. Raney, Riverside, and Benjamin M. Hyman, Chicago, Ill., assignors to International Harvester Company, a corporation of New Jersey Application July 9, 1928. Serial No. 291,182

24 Claims. (Cl. 56—23)

The invention has to do with improvements in harvesters.

In present day harvesting operations, where climatic conditions are suitable, it is the common practice to employ combined harvester threshers, which travel through the field cutting the grain and at the same time threshing it. Such combined machines very materially lower the cost of production as compared with other methods of harvesting. It is a prerequisite to the use of such a combined machine that the grain evenly ripen while standing in the field. Obviously, this limits the use of harvester threshers to such geographical localities where the grain will evenly ripen while standing in the field. It is highly desirable, due to the great saving which these combined machines accomplish, that some way be found for creating a use for these machines in such territories where the grain does not ripen evenly while standing in the field. To some extent, this problem of creating a wider use for harvester threshers has been solved in the employment of converted grain binders or headers which travel through the field while the grain is still too green to be cut by a harvester thresher, such converted machines cutting the grain stalks and discharging them in the formation of windrows in the field. After the grain lies in the field in this windrow for several days, it becomes evenly dried along with any green weeds present which also dry out, due to the action of the wind which ventilates the windrow, and also due to the drying action of the sun. With the grain and weeds in the windrow properly dried, the combined harvester thresher can be brought into action along with a windrow pick-up device, which is in the nature of an attachment designed to be fitted to the platform of the harvester thresher. This pick-up device gathers the windrow and loads it onto the platform of the harvester thresher. From then on, the operation is the same as when harvesting with a harvester thresher.

Of course, the object of windrowing the grain, as has been stated, is to evenly dry the grain and weeds so that they can properly be threshed. Therefore, it is important that such windrow be laid in the field in a manner best adapted to be ventilated and dried. The windrow to be formed should also easily lend itself to the ensuing pick-up operation.

Grain is planted in rows by grain drills, the rows being parallel and spaced apart six or seven inches. Thus, when a windrow is deposited from the usual windrowing machine, the discharged grain lands with such force that it separates the rows of cut stubble, leaving widened spaces into which the grain of the windrow lodges, where, obviously, it cannot evenly ripen or dry out weeds. Thus, it is important that means be provided for preventing a forceful discharge of the grain, and also to prevent lodgement of the grain between stubble rows. It is also desirable in this connection to provide means which will hold the field stubble with the tops thereof bent over while the windrow is laid thereon, so that the stubble may be utilized as a means for supporting the windrow clear of the ground.

With these general thoughts in mind, this invention particularly relates to a novel windrowing machine, which machine will cut the grain and form the same into a windrow well supported above and on the bent-over stubble so that grain and weeds can easily and evenly dry.

The objects of this invention are to provide a simple windrow harvester, which at all times will form the windrow on field stubble and never on standing grain, even when opening up a field; to provide such a machine having a novel frame construction; to provide such a machine in which the cutting platform thereof is counterbalanced by an improved counter-balancing mechanism which will make up and down adjustments of the platform easy; to provide means to cause the width of the machine to be materially narrowed for easy transport through narrow places; to provide a machine of this kind which discharges the grain from the platform in an orderly manner without mixing the same, and forms it in an improved windrow; and, lastly, generally to improve machines of this kind.

Other objects will be apparent to those skilled in the art as this disclosure continues.

Briefly, these desirable objects are accomplished, in the illustrative embodiment herein disclosed, in the provision of a windrow harvester having a longitudinal frame pipe adapted to be supported at its front end either directly on a tractor drawbar or on a pilot steering truck. A transverse frame member extends laterally and grainwardly from and at a right angle with respect to the longitudinal frame member. A suitable brace is provided between these two members. The transverse frame member carries wheels for supporting the back end of the machine. Pivotally connected to the transverse frame member are forwardly extending supports which carry the cutting platform of the machine, the grainward end of this platform extending laterally beyond the grainward wheel and adapted to be folded vertically up to narrow the width of the machine when it is desired to transport the same through a narrow place. A novel form of counterbalance helps support the platform and also makes up and down adjustment of the platform easy. Means is provided on the main frame for supporting the reel in transport position. The platform at its stubbleward end is open, into which the cut grain is discharged as a length of the cutting mechanism is disposed in advance of the opening, and at this open end is a means for causing the windrow to be laid in a certain manner most conducive to uniform drying of the grain and weeds as they lie in the field.

In the accompanying sheets of drawings,—

Figure 1 is a top plan view of the windrow harvester;

Figure 2 is a rear vertical elevational view of the discharge end of the platform;

Figure 3 is a longitudinal sectional view of the platform as seen along the line 3—3 shown in Figure 1 and looking in the direction of the arrows;

Figure 4 is a side elevational view of the machine with the platform partly in section and illustrating the manner of supporting the reel when the machine has been narrowed for transport through narrow places; and, Figure 5 is a rear elevational view, partly in perspective, of the compensating means for the counterbalancing mechanism.

Looking now to Figure 1, it will be seen that the main frame of the machine comprises a single longitudinal pipe frame member 10 supported at its front end on the spindle 11 of a steering pilot wheel truck 12. In some cases it may be desirable to eliminate this wheel truck and to connect the frame member 10 directly to the drawbar of a tractor. Extending right angularly from the member 10 at its rear end in a grainward direction, and secured to the member 10 by a bracket 13, is a transverse pipe frame support 14 in which is mounted at its stubbleward end, a main wheel 15, and at its grainward end, a grain wheel 16. A diagonal brace 17 connected to the members 10 and 14 serves as a cross brace to strengthen the frame. So much as has been described constitutes the main frame of the machine, which, it will be seen, is very simple and strong.

Connected to the under side of the transverse frame pipe 14 at its stubbleward end is a forwardly extending pivotally mounted arm 18; and grainwardly of the member 18 are two crossed, similarly pivotally mounted diagonal and forwardly extending trussed arms 19 and 20. At the grainward side of the wheel 16 is another forwardly extending, pivotally mounted arm 21 to which the forward end of the truss arm 19 is connected. Extending diagonally forwardly and in a grainward direction is another support arm 22 pivotally connected at 23 on a horizontal pivot carried on the arm 21. These arms 18, 19, 20, 21 and 22 carry at their forward ends a harvester platform 24, which at its front end includes the usual Z-bar 25, and, at its back end, the usual angle bar 26. Connected to the forward end of the Z-bar are the guard fingers 27 and the cutting mechanism 28 of the harvester.

The back end of the platform is provided with the usual upright wind board 29, which at its stubbleward end is formed with an arch 30 to leave an arched passageway or opening 31 at the stubbleward end of the platform. It is to be understood that the angle bar 26 stops where this arch begins, so as to leave an unobstructed opening 31 just described, so that the grain discharged from the conveyer may readily turn into the windrow in formation unimpeded by any obstruction, and also to allow for passage of the machine over the windrow, as will be clear. The front end of this opening is provided with a rearwardly and downwardly sloped board 32 which extends from the Z-bar 25, which carries the board, rearwardly of the cutting mechanism and back a short distance into an opening 33 at the stubbleward end of the platform. This opening 33 is substantially in line with the passageway 31 in the backboard 29. The platform 24 carries a conventional form of conveyer apron 34, which is designed to run stubblewardly to discharge the butt ends of its contents when in operation onto the sloped board 32, for a purpose later to be made clear. This conveyer 34 includes at its stubbleward or discharge end, a conventional roller 35, which is carried in the end of a gear box 36 extended upwardly and stubblewardly beyond the edge of the arch 30 and into the passage-way 31, for a purpose later to appear.

As seen in Figure 4, the lower branch of the truss arm 19 has its rear end formed into a threaded shank 37 passed through an eye 38 with nuts 39 on each side of the eye 38, so that, in an obvious manner, by adjusting these nuts, it is possible to take up on the truss arm 19 for the purpose of springing up the grainward end of the platform to adjust the same, to hold it securely, and to some extent prevent whipping thereof when the machine travels over the field, thus materially reducing vibration.

The platform in any conventional manner carries a reel shaft 40 on which is carried a reel 41, the stubbleward end of the reel shaft carrying a bevel gear 42 driven from a bevel pinion 43 on a telescopic longitudinal shaft 44 mounted in the backboard, as shown in Figure 2, at its rear end, where it carries a sprocket wheel 45 driven from a chain 46 deriving its rotation from a sprocket wheel 47 on a longitudinal shaft 48. This shaft 48 at its front end carries a crank 49 connected to a pitman 50 for reciprocating the cutting mechanism 28 in the usual manner. The rear end of the shaft 48 extends into a gear box 51 in which are gears (not shown) connected to a forwardly extending counter-shaft 52 operated from a bevel pinion 53 geared to a bevel gear 54 carried on a shaft (not shown) in a bracket 55 supported on the under side of the frame member 10. This shaft (not shown) is driven by chain and gear connections 56 in any conventional manner from the main wheel 15.

A brake drum 57 is also shown for braking the machine by means of a brake lever 58 connected by a link 59 to the brake mechanism in the drum 57, as indicated. A clutch lever is shown at 60 at the front end of the frame member 10 and it has a link connection 61 to a clutch control rock arm 62 for controlling a clutch (not shown) in the gear box 51, there being a spring 63 for normally holding the clutch in its driving position, as is common in this art. An operator's seat is arranged at 64 on the front end of the frame 10 accessible to these controls.

The conveyor apron 34 is driven from the shaft 44 by means of a sprocket wheel 45 on the shaft 44 and a chain 66, which is trained around idler sprockets 67 and also a driving sprocket 68 on a shaft 69, which shaft 69 operates a gear train 70, indicated in dotted lines, to impart proper direction of rotation to the roller 35, as will be understood. The grainward end of this apron is trained around an idler roller in the usual manner, which is not shown.

A lever 71 is arranged adjacent the seat of the operator and has a connection 72 to the front stubbleward corner of the platform for enabling the operator to raise or lower the platform to accommodate the cutting apparatus to varying heights of grain, as is usual in this art. As the platform is heavy, it is usual to provide a counter-balance mechanism to assist the operator in moving the lever 71. Such means will next be described.

The transverse frame pipe 14 carries a bracket 73 (see Figure 5) on which is mounted on a pin 74, a sector member having an eccentric extension 75 formed with an eye 76 in its free end to which is connected a flexible member 77 running in a transverse direction substantially parallel with the pipe 14. Said flexible connection 77 is connected to a battery of counter-balancing springs 78 which include a rod 79 adjustably connected at 80, to vary the tension of the springs, on the casting 13, as best shown in Figure 1. The pin 74 also carries a concentric sector 81 which at its under side has connected thereto another flexible element 82 which extends upwardly and is trained around a wheel 83 turnably mounted on a pin 84 at the upper end of a standard 85. This flexible element 83 is directed forwardly and is connected to a link 86 having connection to an eye 87 at that point where the arms 19 and 20 cross.

In counter-balancing springs of this kind, it is a well known fact that they have an inherent deficiency in that their force decreases as the platform or load is lifted; in other words, the tension of the spring decreases as the load or platform is lifted, and vice versa, the tension increases when the spring is stretched, as when the load or platform is dropped or lowered. To make for uniformity in the tension of these springs, regardless of the position of the platform, the compensating mechanism just described is interposed in the connection between the springs and the platform. This compensating mechanism includes a concentric portion 81 connected to the platform and an eccentric arm or lever portion 75 connected to the anchored battery of tensioned springs 78. The concentric and eccentric members are integral, or at least so secured together that they will rock as one piece on the shaft 74. It can easily be seen now that when the platform is down, the springs 78 are stretched and under more than initial tension. Thus, when adjustment of the platform upwardly is begun by the lever 71, the spring tension pull counterbalances the platform weight and assists said lever 71 in lifting it. As the platform comes up, the eccentric arm portion 75 also moves up and, in so doing, acts to maintain the stretch and tension in the springs, whereby the pull remains substantially uniform and constant. Thus, the normal tendency of the springs to lose their tension and stretch with a rising platform is compensated for.

When it is desired to transport the machine, the same must first be made narrow, and this is accomplished by disconnecting the telescopic shaft 44 and bodily removing the reel with its shaft 40 and placing the same with the shaft 40 in saddles 88 on frame members 89, at the front end of the machine, and 90, on the rear end of the machine, the reel now assuming a longitudinal position temporarily for storage on the main frame when the machine is being transported. The Z-bar and angle bar include hinges 91, only one of which has been shown, so that an operator can pivot the outer grainward end of the platform vertically up after flexing the outer wind board slightly ahead of the non-movable part of the wind board section of the platform, to enable the outer end of the platform to pivot up without interference by that portion of the wind board which remains in place. Any suitable form of anchor rod, not shown, can then be utilized to hold the outer end of the platform in its upwardly folded position.

In operation the reel and cutting mechanism gather the grain, causing the same to fall on the platform apron 34 with the head ends at the back and the butt ends at the front, as is usual. It is a well known fact that the head ends lag slightly in their movement with the apron 34 because the butts adjacent the cutting mechanism are first moved by the conveyor, so that the butt ends will first be presented to the board 32 in the opening 33 in which the grain is discharged by the conveyor. This board, it is to be observed, is disposed rearwardly of the cutting mechanism adjacent the point of discharge of the grain from the conveyor and between the standing field stubble and said point of discharge. Thus, the board in the first instance must function, obviously, to stop the force of discharge of the grain from the conveyor and prevent its forceful discharge into the stubble and on the ground between the rows thereof. In the next instance this board deflects the tops of all field stubble in its path down and ahead in the direction of travel, it acting then to hold the stubble tops bent over while the windrow is being laid thereon. The weight of the windrow will, after the board no longer acts, still hold the stubble tops bent over, thus causing the stubble itself to function as a support for the windrow. The straws, it will be understood, slide off the board 32 and turn to a slight diagonal and transverse position as they are discharged in the field. As they slide off the board, the stubble engages the head ends of the straws and, in combination with the forward movement of the machine, causes the head ends of the straws to be pulled down first, and, as a result, a windrow is formed in which the straws are disposed slightly diagonally and transversely onto the bent over stubble in the field with the butt ends arranged along one side and the head ends arranged along the other side of the windrow in shingle fashion and above the stubble, where they will be best exposed to the ventilating action of the wind and the drying action of the sun. That grain which is cut by the cutting mechanism directly in front of the platform opening 33 merely falls back, due to the action of the reel, and drops onto the windrow in shingle formation, thus, also supporting this cut of grain in a position above the stubble where it will best cure. The discharge end of the conveyor apron 34 is clear of the arch 30 in the backboard and, as a result, the machine travels over the windrow laid without interfering therewith and, vice versa, the windrow formed cannot be engaged by the chains 46 and 66 because they too are set back out of the way where they cannot catch the straws of the windrow and tangle the same, as the grain from the conveyor has a clear, unimpeded path of turning movement into the windrow in formation.

It can now be seen that the machine of this invention accomplishes all of the desirable objects heretofore recited, and that at no time is it necessary to form the windrow on any standing or uncut grain.

It is the intention to cover in the appended claims all such changes and modifications of the illustrative embodiment of the invention herein shown which do not materially depart from the spirit and scope of the invention.

What is claimed as new is:

1. In a windrow harvester, a platform including cutting apparatus, a conveyor receiving the cut material and delivering it to an end of said platform and rearwardly of the cutting apparatus, and a rearwardly extending plate carried by the platform at the point of discharge of the conveyor and in back of the cutting apparatus, said plate acting to bend over tops of field stubble in its path to prepare an elevated stubble mat upon which the cut crop is laid in a windrow.

2. In a windrow harvester, a platform including cutting apparatus and having a discharge opening at one end rearwardly of said cutting apparatus, a conveyor receiving cut material and delivering it to said opening, and a plate in said opening rearwardly of and between the ends of the cutting apparatus, said plate acting to bend over tops of field stubble in its path to prepare an elevated stubble mat upon which the cut crop is laid in a windrow.

3. In a windrow harvester, a platform including cutting apparatus and having a discharge opening at one end, a conveyor receiving cut material and delivering it to said opening, and a backboard for the platform, said backboard having an opening therein adjacent the platform opening, whereby said backboard cannot impede formation of the windrow being laid.

4. In a windrow harvester, a platform including cutting apparatus and having a discharge opening at one end, a conveyor for receiving the cut material and for delivering it to said opening, a rearwardly extending plate carried by the platform to extend into said opening, and a backboard for the platform, said backboard having an arched passage-way therein adjacent the platform opening directly behind the plate.

5. In a windrow harvester, a platform carried on a front Z-bar and a rear angle bar, said platform having a discharge opening at one end, said Z-bar being continuous and carrying cutting apparatus, said angle bar being broken away at the rear of the opening, a conveyor on the platform running in the direction of said opening, a plate carried by the Z-bar to extend rearwardly and downwardly into the opening, and a backboard carried on the rear angle bar, said backboard being formed with a passage-way adjacent the opening in the platform directly behind the plate.

6. In a windrow harvester, a platform having an opening at one end, a conveyor on the platform feeding to said opening, and a backboard for the platform also provided with an opening adjacent the aforementioned opening, the discharge end of the conveyor protruding laterally beyond the adjacent side of the backboard opening and partly into the platform opening.

7. In a windrow harvester, a platform having an opening at its stubbleward end, a conveyor on the platform feeding to said opening, a plate on the platform projected into the platform opening, and a backboard for the platform also provided with an opening adjacent the aforementioned opening and directly in back of the plate, the discharge end of the conveyor protruding stubblewardly beyond the adjacent side of the backboard opening, whereby said conveyor extends a distance into the platform opening.

8. In a windrow harvester, a platform having cutting apparatus and an opening at its stubbleward end, a conveyor on the platform feeding to the platform opening, a reel for the platform, a backboard for the platform having a passage-way adjacent the platform opening, a plate on the platform extending into the platform opening, said plate acting to bend the tops of field stubble in its path to prepare an elevated stubble mat upon which the windrow is laid, and means for driving the cutting apparatus, reel and conveyor.

9. In a windrow harvester, a platform having an opening at one end, a conveyor on the platform feeding to said opening, a backboard for the platform, said backboard having a passage-way therein adjacent the platform opening, and driven connections carried on the backboard for driving said conveyor.

10. In a windrow harvester, a platform including an angle bar, said platform having an opening at its stubbleward end, the angle bar being broken away adjacent said opening, a backboard for the platform carried on said bar, the backboard having a passage-way therein adjacent the platform opening, a conveyor on the platform, and driven connections carried by the bar and backboard for driving the conveyor in a direction to feed to the platform opening.

11. In a windrow harvester, a platform including an angle bar, said platform having an opening at one end, the angle bar being broken away adjacent said opening, a backboard for the platform carried on said bar, the backboard having a passage-way therein adjacent the platform opening, a conveyor on the platform, a gear box including gearing on the bar for driving the conveyor in a direction to feed to the platform opening, said box also including a sprocket wheel, and driven chain connections carried on the backboard and arched over the passage-way therein for driving said sprocket wheel to operate the gearing and conveyor.

12. In a windrow harvester, a platform including an angle bar, said platform having an opening at its stubbleward end, the angle bar being broken away adjacent said opening, a backboard for the platform carried on said bar, the backboard having a passage-way therein adjacent the platform opening, a conveyor on the platform, said conveyor having its discharge end projecting stubblewardly into the platform opening and inwardly of the adjacent side edge of the backboard passage-way, a gear box including gearing carried on the angle bar for driving the conveyor, and driven connections for the gearing carried on the backboard including a chain and sprocket wheel set back from the sides of the backboard passage-way.

13. In a windrow harvester, a platform having at one end a discharge opening, a backboard for the platform having an arched passage-way adjacent the platform opening, a deflector plate for bending over field stubble tops to prepare an elevated mat for supporting a windrow, said plate arranged in the front part of the platform opening, a conveyor on the platform feeding to the platform opening and projected inside of the backboard passage-way, and driving connections for the conveyor, said connections being carried on the backboard and located away from the passage-way to prevent said connections from winding grain from the windrow as the machine passes thereover.

14. In a harvester, a single longitudinally disposed frame member, a single transverse wheel carried frame member connected at a right angle to the first frame member, a brace between the two frame members, and a harvester platform pivotally connected to the transverse frame member.

15. In a windrow harvester, a transverse wheel carried frame member, a forwardly extending main frame rigidly connected to the transverse frame member at the stubbleward end thereof and having a front wheel support, an offset header platform pivotally carried on the transverse member adjacent the main frame, said platform having a discharge opening at its stubbleward end, a conveyor on the platform for feeding to said opening, and a plate in said opening carried by the platform, said plate acting to deflect tops of field stubble to prepare an elevated windrow supporting mat.

16. In a windrow harvester, a transverse wheel carried frame member, a forwardly extending main frame connected to the transverse member and having a front wheel support, a platform pivotally carried on the transverse frame member adjacent the main frame and having an opening therein at its stubbleward end, a backboard for the platform having a passage-way at its stubbleward end adjacent the platform opening, and a conveyor on the platform to feed material to said platform opening.

17. In a windrow harvester, a transverse wheel carried frame member, a forwardly extending main frame member connected to the transverse member and having a front support, a platform pivotally carried on the transverse member and offset relative to the main frame member, said platform having a discharge opening at one end, a conveyor on the platform for feeding to said opening, a plate in said opening, and a backboard on the platform having a passage-way adjacent the platform opening, said plate acting to deflect tops of field stubble to prepare an elevated windrow supporting mat.

18. In a harvester, a transverse frame member comprising an axle supported by a wheel at each end thereof, a longitudinal frame member carried at its rear end by the transverse axle adjacent the stubbleward wheel, means to support the front end of said longitudinal frame member, a harvester platform arranged forwardly of the axle and transversely of the longitudinal frame member to the rear of its front end support, means to carry the platform from the axle and longitudinal frame member, said platform having a discharge opening therein at its stubbleward end adjacent and to one side of the longitudinal frame member, a conveyor on the platform discharging the cut crop into said opening in a windrow, said opening being disposed to form the windrow between the carrying wheels for the axle.

19. In a harvester, a main frame including a transverse part, wheels carrying said part, a platform pivotally connected to said part, and means for counter-balancing said platform, said means including a transversely disposed spring lying alongside and spaced from said transverse part.

20. In a harvester, a main frame, a platform pivotally mounted thereon, a resilient counter-balance for the platform arranged transversely on the main frame, and means for retaining the pull of said resilient counter-balance substantially uniform in all positions of the platform.

21. In a harvester, a frame, a platform pivoted thereto, a transversely disposed spring for counter-balancing the platform, and compensating means to keep the pull of the spring substantially uniform in all positions of the platform.

22. A harvester having a main frame, wheels carrying the same, a platform, arms connecting the platform to the frame, and means associated with one of said arms for swinging the grainward end of the platform to adjust the same.

23. A harvester having a main frame, wheels carrying the same, a transverse platform, supports including a forwardly and diagonally extending arm for connecting the platform to the frame, and adjusting means for taking up on said diagonal arm to spring the grainward end of the platform.

24. In a windrow harvester having a transverse axle, a pair of wheels for carrying the ends thereof, a longitudinally disposed main frame supported on the axle at its stubbleward end, a header platform connected to the axle in advance thereof and arranged stubblewardly to one side of the main frame and having a portion projecting in advance of and laterally in a grainward direction beyond the grainward wheel, a hinge in said platform in substantial longitudinal alinement with said grainward wheel to enable the said outer projected end of the platform to be folded vertically up to narrow the machine for transport, a removably mounted reel having a normal transverse position over the platform, a pair of longitudinally spaced supports on the main frame, and means on said supports to carry the reel longitudinally of the main frame when it has been removed from its normal position and after the said outer end of the platform has been folded.

EDWARD A. JOHNSTON.
ALEXUS C. LINDGREN.
CLEMMA R. RANEY.
BENJAMIN M. HYMAN.

CERTIFICATE OF CORRECTION.

Patent No. 1,944,347.                                                   January 23, 1934.

EDWARD A. JOHNSTON, ET AL.

It is hereby certified that error appears in the printed specification of the above numbered patent requiring correction as follows: Page 5, line 101, claim 22, for "swinging" read springing; and that the said Letters Patent should be read with this correction therein that the same may conform to the record of the case in the Patent Office.

Signed and sealed this 6th day of March, A. D. 1934.

F. M. Hopkins (Seal)                                Acting Commissioner of Patents.